United States Patent
Wnek et al.

(10) Patent No.: US 10,604,636 B2
(45) Date of Patent: Mar. 31, 2020

(54) ELASTOMERIC AND VISCOELASTIC MATERIALS FORMED FROM POLY(ACRYLIC ACID) GELS

(71) Applicant: Case Western Reserve University, Cleveland, OH (US)

(72) Inventors: Gary E. Wnek, Cleveland, OH (US); Anne Walker, Cleveland, OH (US); Maria Vratsanos, Cleveland, OH (US)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 15/383,206

(22) Filed: Dec. 19, 2016

(65) Prior Publication Data

US 2017/0174862 A1 Jun. 22, 2017

Related U.S. Application Data

(60) Provisional application No. 62/268,862, filed on Dec. 17, 2015.

(51) Int. Cl.
*C08F 20/06* (2006.01)
*C08L 33/02* (2006.01)
(Continued)

(52) U.S. Cl.
CPC .............. *C08K 3/16* (2013.01); *C08F 265/06* (2013.01); *C08J 3/075* (2013.01); *C08K 5/20* (2013.01);
(Continued)

(58) Field of Classification Search
CPC ..... C08L 33/02; C08K 3/16; C08K 2003/162; C08K 2003/166; C08K 2003/168
See application file for complete search history.

(56) References Cited

U.S. PATENT DOCUMENTS 6,271,278 B1 * 8/2001 Park ................. A61L 15/60
521/102
2007/0237956 A1 * 10/2007 Figuly ............. A61K 9/0034
428/402
(Continued)

FOREIGN PATENT DOCUMENTS

WO    WO-03089506 A1 * 10/2003 ........... A61K 9/0065

OTHER PUBLICATIONS

Lee and Tu (Journal of Applied Polymer Science, 1999, 72, 1221-1232).*

(Continued)

*Primary Examiner* — Vu A Nguyen
(74) *Attorney, Agent, or Firm* — Benesch, Friedlander, Coplan & Aronoff LLP

(57) ABSTRACT

Disclosed herein are novel materials and methods of forming those novel materials. The materials are synthesized from Poly(acrylic acid), a crosslinker; and a salt. The material can be further synthesized from sodium hydroxide. The crosslinker can be a covalent crosslinking agent such as N,N'-methylenebisacrylamide. Examples of applicable salts are calcium chloride, lithium chloride, zinc chloride, sodium chloride, potassium chloride, barium chloride, cesium chloride, magnesium chloride, cobalt chloride, lithium bromide. In example, the Poly(acrylic acid) can be about 3 moles of Poly(acrylic acid), the crosslinker can be about 0.005 moles of N,N'-methylenebisacrylamide, and the salt can be formed by the addition of about 0.003 moles of potassium persulfate.

2 Claims, 7 Drawing Sheets

(51) Int. Cl.
*C08K 3/16* (2006.01)
*C08J 3/075* (2006.01)
*C09J 133/02* (2006.01)
*C08F 265/06* (2006.01)
*C08K 5/20* (2006.01)
*C09J 4/06* (2006.01)

(52) U.S. Cl.
CPC ............... *C09J 4/06* (2013.01); *C09J 133/02* (2013.01); *C08J 2333/02* (2013.01); *C08K 2003/162* (2013.01); *C08K 2003/166* (2013.01); *C08K 2003/168* (2013.01)

(56) References Cited

U.S. PATENT DOCUMENTS

| | | | | |
|---|---|---|---|---|
| 2010/0210465 | A1* | 8/2010 | Li | A01N 25/28 504/223 |
| 2012/0258851 | A1* | 10/2012 | Nakatsuru | C08F 220/06 502/7 |
| 2013/0164206 | A1* | 6/2013 | Yoon | C08F 20/06 423/432 |
| 2016/0367731 | A1* | 12/2016 | Prewett | G06Q 20/325 |

OTHER PUBLICATIONS

Kostic et al. (J. Serb. Chem. Soc. 2007, 72 (11), 1139-1153).*
Wang et al., AAPS PharmSciTech, vol. 15, No. 5, Oct. 2014, pp. 1149-1154 (Year: 2014).*
Hernandez et al., Ind Eng Chem Res. Jan. 22, 2014, 53(3): 1130-1142.*
Larsson et al., E-Polymers, vol. 9(1), pp. 1683-1696.*
Schosseler et al. Macromolecules 1991, 24, 225-234.*
Yazici et al. Polymer 2005, 46, 2595-2602.*
Horkay et al. (Biomacromolecules 2000, 1, 84-90).*
Sugitani et al. Polymer Preprints (Japan), 1987, 36, 2876.*

* cited by examiner

ELASTOMERIC AND VISCOELASTIC MATERIALS FORMED FROM POLY(ACRYLIC ACID) GELS

RELATED APPLICATION

This application claims priority to U.S. Provisional Patent Application Ser. No. 62/268,862, titled "Elastomeric and Viscoelastic Materials formed from Poly(acrylic acid) Gels," which was filed on Dec. 17, 2015, which is expressly incorporated by reference herein in its entirety.

FIELD OF INVENTION

The present disclosure generally relates to modifying material properties by introducing salts or base during synthesis of materials. More specifically, the present disclosure relates to modifying the properties of Poly(acrylic acid) by introducing salts or base during synthesis of Poly(acrylic acid).

BACKGROUND

New materials, especially those with "tunable" mechanical properties are in high demand for any number of applications. This is particularly so for materials that are reactive to their environment and that are flexible and pliable. For example, the robotics industry is always searching for actuators that can be fabricated into unique shapes and that can bend and move with the movement of machines. In another example, the biomedical engineering industry is always searching for artificial tissue, seeking to build synthetic muscles and nerves that mimic those of the human body. Numerous industries seek better adhesives that possess the seemingly contradictory behavior of being both very adhesive yet simple to remove from surfaces. Energy storage systems, including batteries and supercapacitors, are in need of better ion-transporting materials that are affordable, ionically conducting, and non-flammable. Additionally, active membranes, sensors, and responsive coatings all can benefit from new material types and materials with enhanced tenability of structure, composition, and properties.

There is a need for materials and methods for synthesizing such new materials that offer tunable mechanical properties.

SUMMARY

Disclosed herein are novel materials synthesized from Poly(acrylic acid) ("PAA"), a crosslinker; and a salt. The material can be further synthesized from sodium hydroxide. The crosslinker can be a covalent crosslinking agent such as N,N'-methylenebisacrylamide. Examples of applicable salts are calcium chloride, lithium chloride, zinc chloride, sodium chloride, potassium chloride, barium chloride, cesium chloride, magnesium chloride, cobalt chloride, lithium bromide.

Further disclosed herein are methods of synthesizing a novel material that includes the steps of providing Poly(acrylic acid), a crosslinker, and a salt; and forming the novel material. The methods can include the further step of providing sodium hydroxide. The crosslinker is a covalent crosslinking agent, for example N,N'-methylenebisacrylamide. The salt can be selected from calcium chloride, lithium chloride, zinc chloride, sodium chloride, potassium chloride, barium chloride, cesium chloride, magnesium chloride, cobalt chloride, and lithium bromide. In one example, the Poly(acrylic acid) can be about 3 moles of Poly(acrylic acid), the crosslinker can be about 0.005 moles of N,N'-methylenebisacrylamide, and the salt can be formed by the addition of about 0.003 moles of potassium persulfate.

BRIEF DESCRIPTION OF THE DRAWINGS

Objects and advantages together with the operation of the invention may be better understood by reference to the detailed description taken in connection with the following illustrations, wherein.

DETAILED DESCRIPTION

Figure 1:
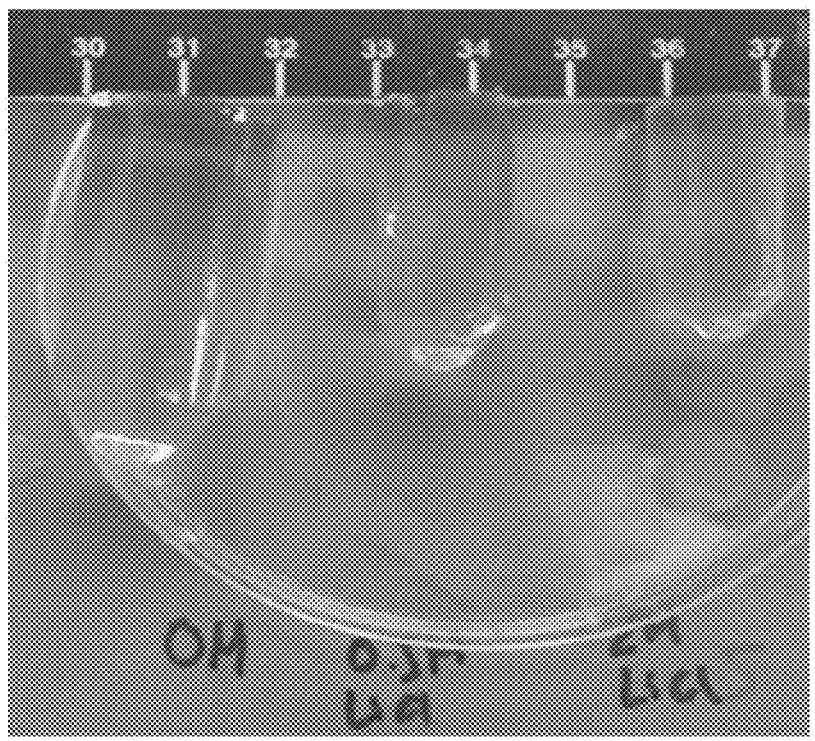
FIG. 1 is a photograph depicting three samples of lithium chloride loaded PAA gel with varying salt content.

The apparatus and methods disclosed in this document are described in detail by way of examples and with reference to the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be and should not be construed as mandatory or limiting unless specifically designated as such. Selected examples of elastomeric and viscoelastic PAA gels and methods and systems for forming such elastomeric and viscoelastic PAA gels are hereinafter disclosed and described in detail with reference made to FIGS. 1-8.

PAA is an anionic polyelectrolyte that can be crosslinked in a variety of ways to render it water-insoluble, yielding a highly swellable hydrogel. Typically, PAA formed with traditional synthesis methods readily chelate cations post-synthesis in salt solutions. It has been found that the introduction of inorganic salts or base prior to synthesis can affect the overall material behavior of such hydrogels. As described herein, the properties of PAA can depend on concentrations of inorganic salts or base during synthetization. Synthesizing PAA with varying concentrations of salt or base results in properties that are substantially different compared to properties for PAA when the PAA is synthesized with only water and a cross-linker. An exemplary cross-linker can be methylene-bisacrylamide either alone or in combination with other compounds and substances.

Furthermore, the properties of synthesized materials can vary significantly based on the concentrations of salt and whether the material was exposed to salt during synthesis or post-synthesis. For example, a material that is synthesized with a specific concentration of salt will have substantially different properties than if the material is exposed to the same concentration of salt post-synthesis. Such a finding can indicate that the addition of the concentration of salt during synthesis can significantly influence the polymerization and gelation process of the material and significantly influence the resulting polymer structure of the material.

Because neither salt alone nor PAA hydrogels synthesized without high salt concentration exhibit such properties found in material described herein, the materials described herein are new and novel compositions of matter.

Examples described herein exhibit changes in properties of PAA gels synthesized with different types and concentrations of salt. Such properties include, for example, reduced equilibrium swelling, increased modulus, high extensibility, and interesting viscoelastic behavior.

As noted above, PAA can be formed into swellable gels. PAA gels have broad interest because such gels can experience large volumetric changes with changes in pH or monovalent/multi-valent cation exchange. PAA gels can exhibit large, static electrical potentials of up to −120 mV, where the composition and concentration of bathing salt can affect the magnitude of the electrical potential. Bathing anion can specifically have an influence, and dihydrogen phosphate can have an effect as well, which can have an impact on important biological phenomena. The synthesis of PAA gels can be conducted in the presence of various added salts, and result in a variety of materials with beneficial elastic and viscoelastic properties. Such properties and characteristics of this novel class of soft materials are discussed herein.

PAA gels, which can also be hydrogels, can be formed using water, acrylic acid, a free-radical initiator, and a covalent crosslinking agent. In one example, described herein, the primary initial composition of the reaction mixture is 3 M acrylic acid, 5 mM N,N'-methylenebisacrylamide and 3 mM potassium persulfate. Optionally, sodium hydroxide can be employed to partially convert acrylic acid monomer to the sodium salt and to adjust the pH. The compounds are mixed, and varying concentrations of salts can be added and then mixed again. Chloride salts of sodium, lithium, potassium, barium, cesium, calcium, magnesium, zinc, and cobalt can be used in concentrations during synthesis ranging from about 0.25 M to about 2 M. Additionally, lithium bromide can be used in the range of concentrations from about 0.25 M to about 2 M.

Once the salt is added, polymerization can be initiated by incubating at about 80° C. in an oven for about 60 minutes, and reaction completion can be assisted by allowing the materials to stand for about 24 hours before use. After synthesis, the materials can be dried in a vacuum oven to remove all water; washed with distilled water over a period of several days; or washed and then dried in a vacuum oven to remove all residual water. After any of these processes, the material can be analyzed and properties measured and/or evaluated.

Sodium hydroxide (NaOH) can be used as the primary method of varying base concentration during synthesis. The NaOH molarity can range from about zero to about 3.5 M, which can correspond to pre-synthesis pH of about 1 for materials containing no base to a pre-synthesis pH of about 5.5 for materials containing about 2.0 M of base. Materials above that concentration can rapidly polymerize. After the addition of a base, the reaction can be initiated and carried out as described above.

For the purpose of this disclosure, discussion will focus on the materials synthesized using chloride salts of lithium, potassium, sodium and calcium, as well as lithium bromide. However, it will be understood that this disclosure is broader than synthesis using such listed materials. Physical properties of salt-loaded samples are discussed herein.

With the exception of sodium and potassium salts, gels loaded with chloride salts at concentrations higher than 0.5 M exhibited increasing opacity up until the 2 M concentration, at which point the gels became opaque prior to washing. Once washed, magnesium and calcium-loaded gels retained some degree of opacity, where the lithium salts became totally clear upon washing.

Figure 2:
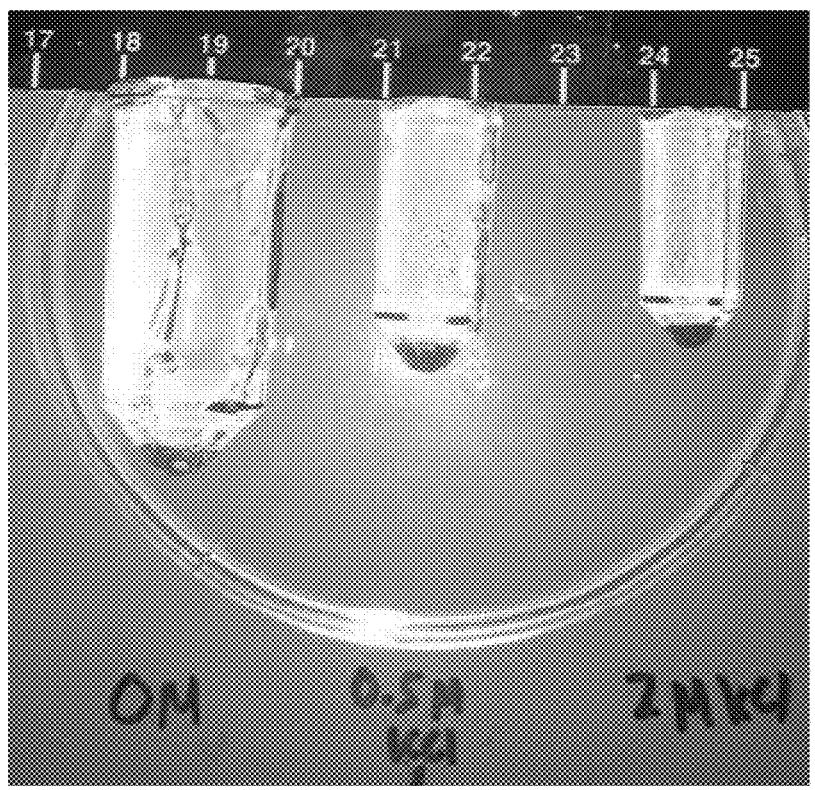
FIG. 2 is a photograph depicting three samples of potassium chloride loaded PAA gel with varying salt content.

As illustrated in FIGS. 1 and 2, equilibrium swelling can decrease with increasing salt content amongst disclosed salt types. FIG. 1 is a photograph of three samples illustrating equilibrium swelling size of lithium chloride loaded PAA gels. The first sample (viewed from left to right) is synthesized at 0 M of salt content, the second sample at 0.5 M of salt content, and the third sample at 2 M of salt content. FIG. 2 is a photograph of three samples illustrating equilibrium swelling size of potassium chloride loaded PAA gels. The first sample (viewed from left to right) is synthesized at 0 M of salt content, the second sample at 0.5 M of salt content, and the third sample at 2 M of salt content. For both FIGS. 1 and 2, the scale shown is in centimeters.

Figure 3A:
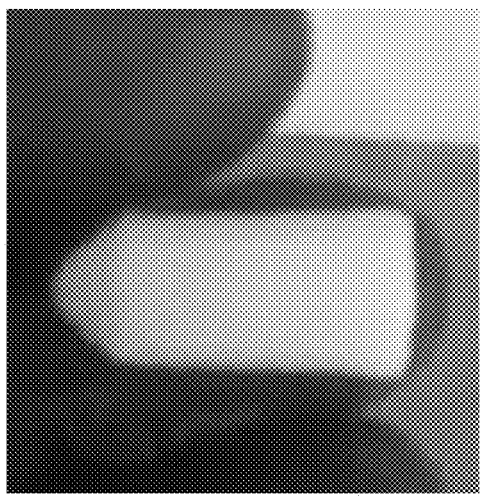
FIG. 3A is a photograph depicting a 2 M lithium chloride loaded PAA sample after it is removed from a container.
Figure 3B:
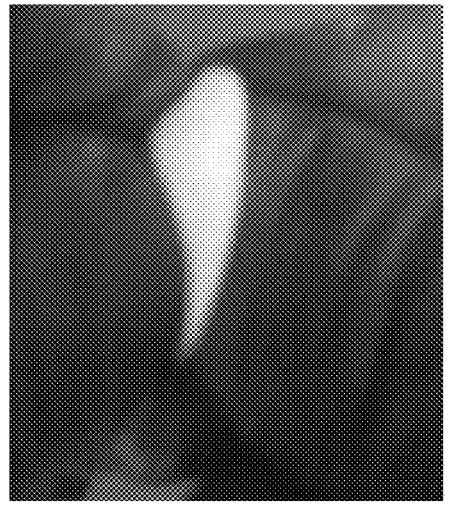
FIG. 3B is a photograph depicting the sample of 3A under compression.
Figure 3C:
FIG. 3C is a photograph depicting the sample of 3A under compression.
Figure 3D:
FIG. 3D is a photograph depicting the sample of 3A released from compression.
Figure 3E:
FIG. 3E is a photograph depicting the sample of 3A recovering its original shape.

With the exception of the lithium bromide loaded samples, materials synthesized as described herein retained the shape of the container they were synthesized in. As salt concentration increased, tackiness decreased across all salt types. Viscoelastic behavior increased with increasing salt concentration, with the strongest behavior being exhibited by the multivalent salts and the lithium chloride salts. FIGS. 3A-3E are a series of photographs illustrating the recovery of the original shape of a 2 M lithium chloride loaded PAA gel after it is subjected to compression and the compression is released. FIG. 3A illustrates a sample after removal from its container. FIGS. 3B and 3C illustrate the sample under compression. FIG. 3D illustrates the sample after compressive forces are removed. FIG. 3E illustrates the sample after its original shape is recovered.

Figure 4A:
FIG. 4A is a photograph depicting a 1 M lithium bromide loaded PAA sample after it is removed from a container.
Figure 4B:
FIG. 4B is a photograph depicting the sample of 4A deformed under tension.
Figure 4C:
FIG. 4C is a photograph depicting the sample of 4A released from tension.

Gels made with lithium bromide become sticky as concentration of lithium bromide during synthesis is increased, and tend to exhibit increasing "flow" behavior with increasing salt concentration. At 1 M lithium bromide concentration, a sample begins to lose the shape of the original container, relaxing and spreads slightly across the surface on which it is placed. However, as illustrated by FIGS. 4A-4C, such 1 M lithium bromide concentration samples do retain some memory of the original shape. FIG. 4A illustrates a 1 M lithium bromide loaded sample after removal from its original container. FIG. 4B illustrates the sample deformed under tension. FIG. 4C illustrates the sample after the tension is released, partially returning to its original shape.

A sample synthesized using a 2 M lithium bromide concentration did not set when placed on a flat surface.

Figure 5A:
FIG. 5A is a photograph depicting a 2 M lithium chloride loaded PAA sample in its free state.
Figure 5B:
FIG. 5B is a photograph depicting the sample of 5B substantially extended under a tensile force.

As base concentration increased, materials become less tacky and exhibit stronger viscoelastic behavior. With highest base concentration, such as 3.0 M NaOH, samples recover fully after a several-second delay. Selected salt-containing PAA materials, such as a sample prepared with 2.0 M lithium chloride, show unusual elastomeric properties. FIGS. 5A and 5B illustrate high extensibility of 2 M lithium chloride loaded PAA material. FIG. 5A illustrates a 2 M lithium chloride loaded PAA sample in a free state, and FIG. 5B illustrates the 2 M lithium chloride loaded PAA sample substantially extended under tension. Such a material can be stretched to almost 10× its original length, and quickly "snaps back" to original dimensions once forces are removed. This high extensibility and strong elastic response is uncommon for crosslinked PAA materials prepared under conventional synthesis methods.

Figure 6:
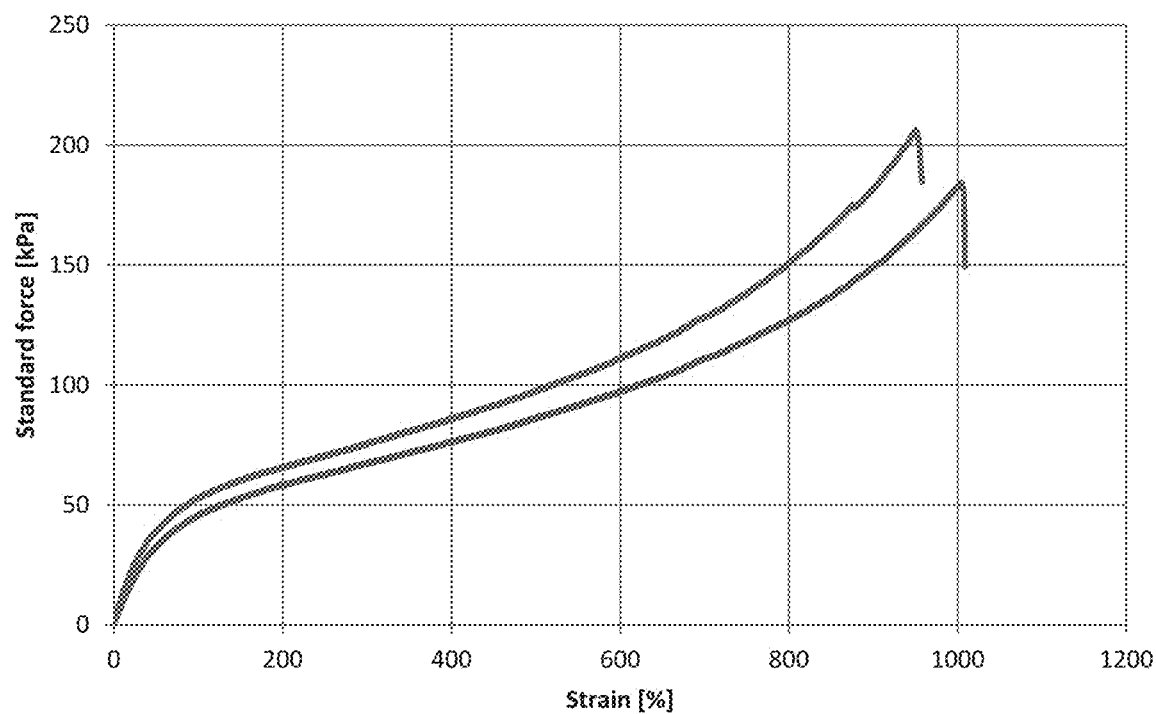
FIG. 6 is a graph that depicts the stress versus strain relationship for two different 2 M calcium chloride samples.

Salt loaded PAA materials were tested for mechanical properties. PAA samples loaded with 2 M lithium chloride, calcium chloride, and sodium chloride were tested using a Zwick Uniaxial Tensile Testing Machine outfitted with a 500 N load cell. Samples were cut into strips measuring 2.5 cm in length, 0.5 cm in width, and 0.2 cm in thickness. All samples were tested at a continuous strain rate of 1 mm/minute and strained until fracture. Table 1 below summarizes the results of this experiment. FIG. 6 illustrates a representative stress versus strain graph of two different 2 M calcium chloride samples.

TABLE 1

| Salt Type | Max Strain (%) | Stress at fracture (kPa) | Young's Modulus (kPa) |
|---|---|---|---|
| 2M LiCl | 960.5 | n/a | 106 |
| 2M CaCl$_2$ | 981.5 | 195 | 105 |
| 2M NaCl | 691 | 141 | 69 |

Figure 7:
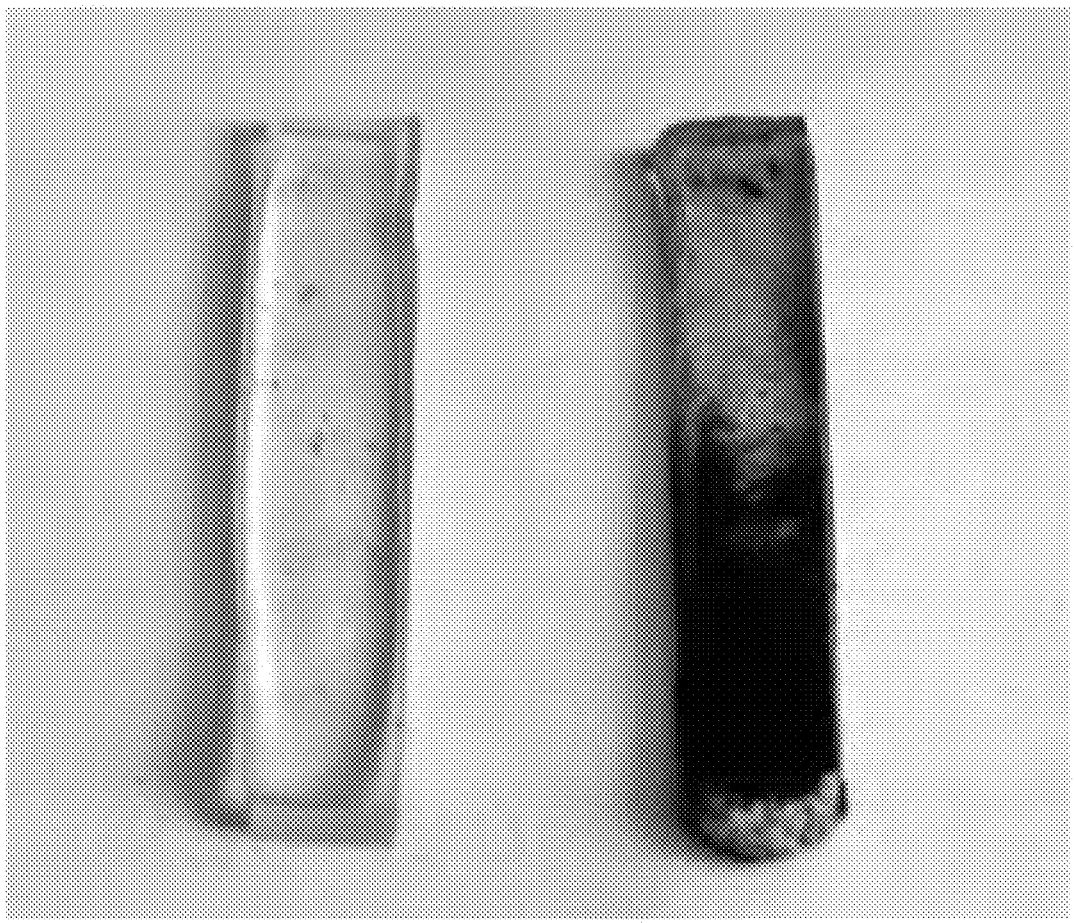
FIG. 7 is a photograph depicting a 2 M sodium chloride PAA gel before (on left) and after (on right) exposure to a flame.

Samples of the 2 M sodium chloride and 2 M calcium chloride gels were tested for flammability using a match. The match was lit, and the edge of a strip of gel of the same dimensions noted above was brought to the tip of the flame and held for 5 seconds. In all cases, the samples charred but did not catch fire. Samples that had been allowed to dry in air, then dried overnight in a vacuum oven to ensure complete water removal also charred but did not actively catch fire. FIG. 7 illustrates a 2 M sodium chloride PAA gel before (on left) and after (on right) exposure to a flame as described above.

Figure 8:
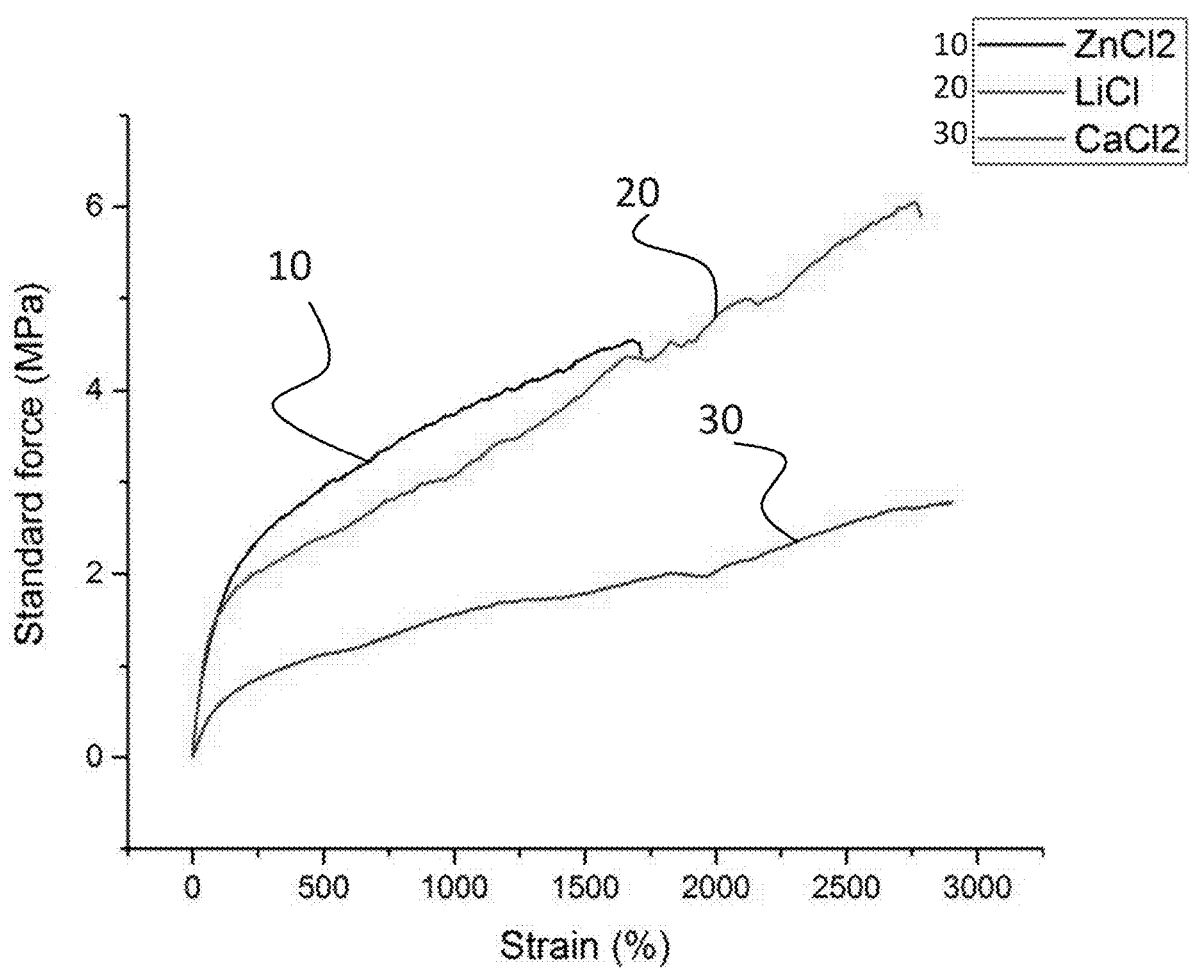
FIG. 8 is a graph that depicts 6 M PAA samples loaded with calcium chloride, lithium chloride, and zinc chloride tested at a constant strain of 100% per second.

PAA loaded with 2 M calcium chloride, lithium chloride, and zinc chloride were equilibrated at 40% relative humidity for 48 hours then analyzed on a tensile testing apparatus and run at a constant strain rate of 100% per second. The calcium chloride achieved a modulus of 60 kPa and a fracture stress of 2.75 MPa, lithium chloride achieved a modulus of 20 kPa and a fracture stress of 6 kPa, and zinc chloride samples achieved a modulus of 22 kPa and 4.5 MPa. FIG. 8 illustrates such test results (with zinc chloride sample identified by reference number 10, lithium chloride sample identified by reference number 20, and calcium chloride sample identified by reference number 30). The most interesting result, demonstrated by the representative curves of FIG. 8, is the exceedingly high strain exhibited by the samples. Each sample exhibited at least 1500% strain, which is highly unusual for a hydrogel material. Additionally, samples that are strained to near max strains without breaking will, once the force is removed, return to their original shape within seconds.

One primary application for the materials described herein is as an adhesive. Samples can be placed between the two surfaces being bound together and allowed to dry, yielding a strong bond. Significant force is required to separate the samples. Dried PAA materials separate cleanly from one surface, leaving behind no residue. The strength of the bond and its sensitivity to removal using water can be modified by a change in the pre-synthesis additive mixture. Changes to base and salt content yields different adhesive properties. Given that some gels, such as the lithium bromide loaded samples, are more "spreadable," strong, high surface area adhesives can be produced. The addition of water weakens the adhesive properties of the materials, which allows for a clean removal with little applied force. Base content or salt content and type affected how much water was necessary for clean removal.

High metal loading materials achieved with the methods disclosed herein can also have applications for soft actuators and active membranes. Actuators require high density charge carrying species, and the materials disclosed herein can be tailored with different loading levels to fit specific needs. High extensibility and elastic recovery are especially useful properties in such applications.

The salt-PAA gels disclosed herein have demonstrated beneficial behavior and a number of beneficial properties that have significant applications in a number of industries. Additionally, the salt-loaded and base-loaded PAA gels described herein differ greatly from non-loaded PAA samples, and represent a new composition of matter.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

What is claimed is:

1. A viscoelastic gel material formed from a mixture comprising water, 3M acrylic acid, 5 mM N,N-methylenebisacrylamide, 3 mM potassium persulfate and 0.25-2 M of a salt selected from the group consisting of CaCl$_2$, LiCl, ZnCl$_2$, NaCl, KCl, BaCl$_2$, CsCl, MgCl$_2$, CoCl$_2$ and LiBr.

2. A method of forming a viscoelastic gel material including the steps of:
preparing a mixture comprising water, 3M acrylic acid, 5 mM N,N-methylenebisacrylamide, 3 mM potassium persulfate and 0.25-2 M of a salt selected from the group consisting of CaCl$_2$, LiCl, ZnCl$_2$, NaCl, KCl, BaCl$_2$, CsCl, MgCl$_2$, CoCl$_2$ and LiBr; and
synthesizing the viscoelastic gel material.

* * * * *